United States Patent
Mouch et al.

(10) Patent No.: US 7,210,733 B2
(45) Date of Patent: May 1, 2007

(54) TUBULAR SUPPORT FOR SHOCK TOWER IN AUTOMOBILES

(75) Inventors: Tim Mouch, Troy, MI (US); Michael Azzouz, Livonia, MI (US); Musa Azzouz, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 197 days.

(21) Appl. No.: 11/012,748

(22) Filed: Dec. 15, 2004

(65) Prior Publication Data

US 2005/0236827 A1    Oct. 27, 2005

Related U.S. Application Data

(60) Provisional application No. 60/564,432, filed on Apr. 22, 2004.

(51) Int. Cl.
*B62D 21/11* (2006.01)

(52) U.S. Cl. ............... 296/203.02; 296/193.09; 296/205; 280/124.155; 280/788

(58) Field of Classification Search ........... 296/29, 296/203.01, 203.02, 205, 193.09; 280/124.1, 280/124.109, 124.155, 785, 788
See application file for complete search history.

(56) References Cited

U.S. PATENT DOCUMENTS

| | | | |
|---|---|---|---|
| 4,542,934 A | | 9/1985 | Komatsu et al. |
| 4,560,198 A | * | 12/1985 | Katano et al. ......... 296/203.02 |
| 4,919,474 A | | 4/1990 | Adachi et al. |
| 5,024,482 A | | 6/1991 | Isukimi et al. |
| 5,031,958 A | * | 7/1991 | Fujita et al. ........... 296/203.02 |
| 5,071,188 A | * | 12/1991 | Thum ........................ 296/205 |
| 5,102,164 A | | 4/1992 | Fujinaka et al. |
| 5,303,973 A | * | 4/1994 | Fujii ..................... 296/203.02 |
| 5,372,400 A | * | 12/1994 | Enning et al. ......... 296/203.03 |
| 5,466,035 A | | 11/1995 | Klages et al. |
| 6,139,094 A | * | 10/2000 | Teply et al. ........... 296/203.03 |
| 6,205,736 B1 | * | 3/2001 | Amborn et al. ............... 52/633 |
| 6,409,255 B2 | * | 6/2002 | Tilsner et al. .......... 296/187.09 |
| 6,655,728 B2 | | 12/2003 | Sano et al. |
| 7,036,874 B2 | * | 5/2006 | Stojkovic et al. ...... 296/193.09 |
| 7,052,076 B2 | * | 5/2006 | Kim ....................... 296/187.09 |
| 7,066,533 B2 | * | 6/2006 | Sohmshetty et al. ... 296/203.02 |

(Continued)

FOREIGN PATENT DOCUMENTS

JP    02200580 A  *  8/1990  ................. 296/29

(Continued)

*Primary Examiner*—D. Glenn Dayoan
*Assistant Examiner*—Paul Chenevert
(74) *Attorney, Agent, or Firm*—Gigette M. Bejin; Miller Law Group, PLLC

(57) ABSTRACT

A shock tower support structure utilizes a hydroformed tubular member that extends horizontally along the upper vehicle frame rail and wraps around the front edge and upper portion of the shock tower assembly to join into the lower vehicle frame rail. The shock tower support member is welded to the upper vehicle frame and also to the lower vehicle frame. The loading of the spot welds is in shear to provide improved stiffness in the support of the vehicle shock tower assembly. The support structure also provides increased crash resistance for front impacts into the vehicle. The front apron in conventional shock tower supports can be replaced by a plastic panel that has associated components pre-assembled thereon to be installed into the vehicle as a module.

17 Claims, 4 Drawing Sheets

U.S. PATENT DOCUMENTS 7,090,273 B2 * 8/2006 Stojkovic et al. ............ 296/29
2004/0051345 A1 * 3/2004 Gabbianelli et al. ... 296/203.01
2005/0236827 A1 * 10/2005 Mouch et al. .............. 280/788

FOREIGN PATENT DOCUMENTS

| | | | | |
|---|---|---|---|---|
| JP | 02293276 A | * | 12/1990 | ................ 296/192 |
| JP | 02293277 A | * | 12/1990 | ............ 296/203.01 |
| JP | 04092775 A | * | 3/1992 | .............. 296/146.4 |
| JP | 05077762 A | * | 3/1993 | ................ 280/785 |

* cited by examiner

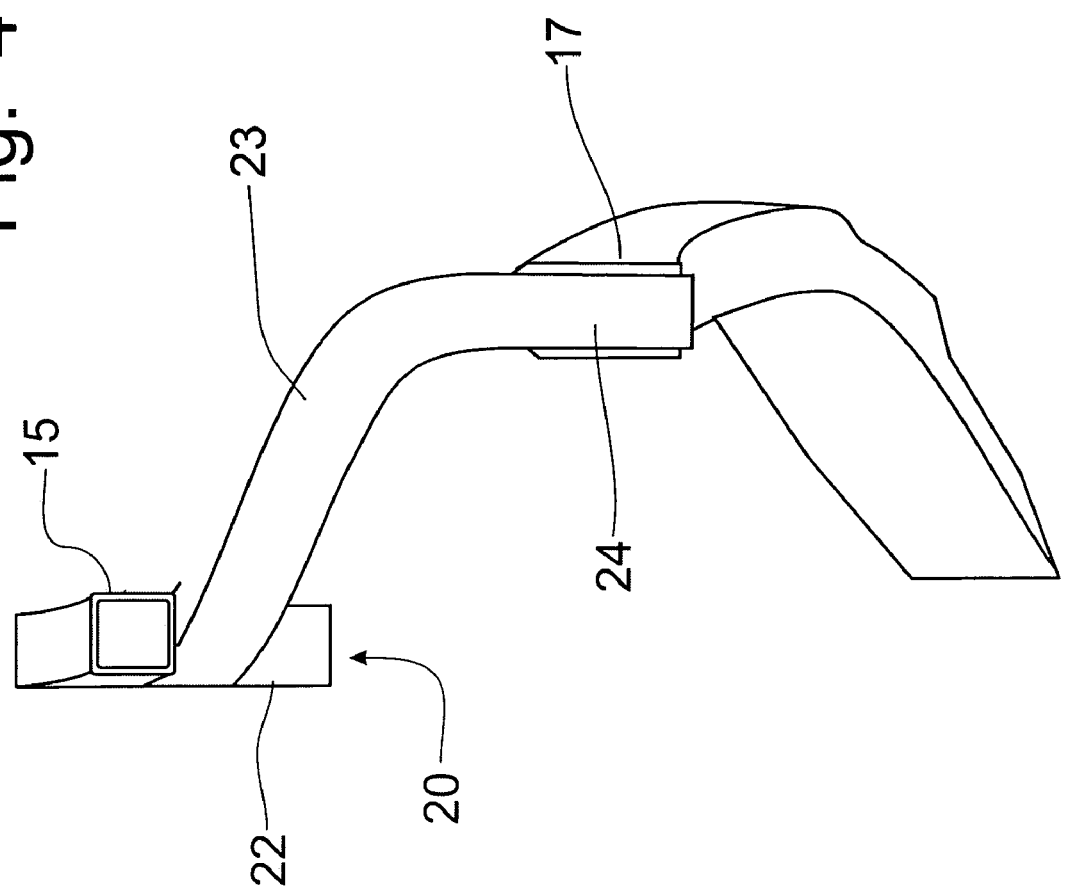

TUBULAR SUPPORT FOR SHOCK TOWER IN AUTOMOBILES

CROSS-REFERENCE TO RELATED APPLICATIONS

This application claims domestic priority on U.S. Provisional Patent Application Ser. No. 60/564,432, filed Apr. 22, 2004, the contents of which are incorporated herein by reference.

BACKGROUND OF THE INVENTION

Manufacturing processes for automobile frames are evolving from one that currently utilizes MIG welding processes, i.e. an arc welding process in which a line of molten material is deposited by the welder in joining two pieces of metal together, to a spot-welding process. Spot-welding, a process involving the passage of electrical current between two electrodes to melt and join two pieces of metal placed between the electrodes, is being utilized in a greater degree in the manufacturing of automotive vehicles. Spot-welding requires a frame design that is conducive to being assembled using the spot-welding process. For example, if two tubular members are being spot-welded, access to the adjoining walls of the two tubular members by the spot-welder electrodes must be provided. MIG welding, on the other hand, is not compatible with a high production assembly plant. MIG welding, however, can be used for sub-assembly operations at a supplier level.

Automotive shock absorbers are vehicle components that absorb road forces encountered by the wheels of the vehicle. The shock absorber is physically connected to the wheel structure and is supported against the automobile frame to resist the action of the shock absorber. Conventional support of the shock absorber includes a front apron and a rear apron that help resist road forces.

Crash protection is also an important design consideration for an automobile frame as industry requirements provide that certain crash forces must be absorbed within the frame to protect the occupants. Improvements to the vehicle frame to better support the shock tower can also enable the steel front apron to be replaced by a plastic apron that can be utilized as a modular subassembly while also providing improvements to absorb crash forces.

U.S. Pat. No. 6,655,728, issued to Maki Sano, et al on Dec. 2, 2003, discloses the use of two seamless frame members fabricated from extruded aluminum alloy or magnesium to support an automotive shock tower. Similarly, U.S. Pat. No. 5,466,035, issued to Ulrich Klages, et al on Nov. 14, 1995, teaches a wheel housing support that is connected to a brace and a pillar by welding, although adhesive or rivets may alternatively be utilized to make the connection.

U.S. Pat. No. 5,024,482, issued to Hayatsugu Harasaki, et al on Jun. 18, 1991, discloses that the apron and the shock tower can be joined by welding. After the elements are joined together, the combined unit is welded to the seamed tubular member and the U-shaped reinforcing member. In U.S. Pat. No. 5,102,164, issued to Mitsuru Fujinaka, et al on Apr. 7, 1992, the apron and shock tower is supported between an upper seamed tubular member and a lower tubular connection formed by the tower and the U-shaped member.

U.S. Pat. No. 5,031,958, issued to Hideharu Fujita, et al on Jul. 16, 1991, discloses the formation of a tubular reinforcing member from two independent members. The shock tower is formed by two additional members. In U.S. Pat. No. 4,542,934, issued to Nobuhiro Komatsu, et al on Sep. 24, 1985, the apron is supported on two tubular members which can be spot-welded, as is noted in the paragraph spanning columns 4 and 5 of the patent.

U.S. Pat. No. 4,919,474, granted to Ryoichi Adachi, et al on Apr. 24, 1990, teaches a further example of an apron and shock tower formed by multiple members or elements. These elements are connected to form the apron and are attached to the frame of the vehicle.

None of the cited prior art teaches a shock tower support framework that utilizes hydroformed members that are spot-welded to provide support for the shock tower, with the frame support extending horizontally to connect to the upper vehicle frame and can be spot-welded to the lower vehicle frame in a T-configuration to improve crash resistance while providing an excellent support for the resistance of road forces by the shock absorber, thus providing a frame design that can be assembled in a high production assembly plant.

SUMMARY OF THE INVENTION

It is an object of this invention to overcome the aforementioned disadvantages of the known prior art by providing a hydroformed shock tower frame support that can be assembled to the body shell using a spot-welding process.

It is another object of this invention to provide a shock tower support that enhances crash force resistance by providing an additional load path.

It is a feature of this invention that the shock tower support can be joined to the adjacent vehicle body shell by a spot-welding process.

It is another feature of this invention that the steel front apron normally associated with a shock tower support structure can be eliminated from the assembled frame.

It is yet another advantage of this invention that the front apron can be formed in plastic as a module component that has other associated components pre-assembled to be installed as a module.

It is still another advantage of this invention that the stiffness of the shock tower is improved.

It is still another feature of this invention that the positioning of the shock tower support to wrap around the front edge and upper portion of the shock tower assembly and then joining the lower frame member in a shear configuration.

It is a further feature of this invention that the connection of the shock tower support to the upper rail through spot-welded joints.

It is a further advantage of this invention that the number of welds and the number of weld stations needed in the manufacturing process at the assembly plant are reduced, thus lowering manufacture and assembly costs.

It is still a further advantage of this invention that the design of the shock tower support provides an opportunity to provide a sub-assembly module for the mounting of some of the vehicle engine components, which sub-assembly can be pre-assembled before bolting onto the shock tower support.

It is a further object of this invention to provide a support structure for an automotive vehicle shock tower that is durable in construction, inexpensive of manufacture, facile in assemblage, and simple and effective in use.

These and other objects, features and advantages are accomplished according to the instant invention by providing a shock tower support structure that utilizes a hydroformed tubular member that extends horizontally along the upper vehicle frame rail and wraps around the front edge and upper portion of the shock tower assembly to join into the lower vehicle frame rail. The shock tower support member is spot-welded to the upper vehicle frame and arc-welded to the lower vehicle frame. The loading of the spot welds is in shear to provide improved stiffness in the support of the vehicle shock tower assembly. The support structure also provides increased crash resistance for front impacts into the vehicle. The steel front apron in conventional shock tower supports can be replaced by a plastic panel that has associated components pre-assembled thereon to be installed into the vehicle as a module.

BRIEF DESCRIPTION OF THE DRAWINGS

The advantages of this invention will become apparent upon consideration of the following detailed disclosure of the invention, especially when taken in conjunction with the accompanying drawings wherein:

FIG. 4 is a front elevational view of the portion of the automotive frame depicted in FIG. 3.

DETAILED DESCRIPTION OF THE PREFERRED EMBODIMENT

Figure 1:
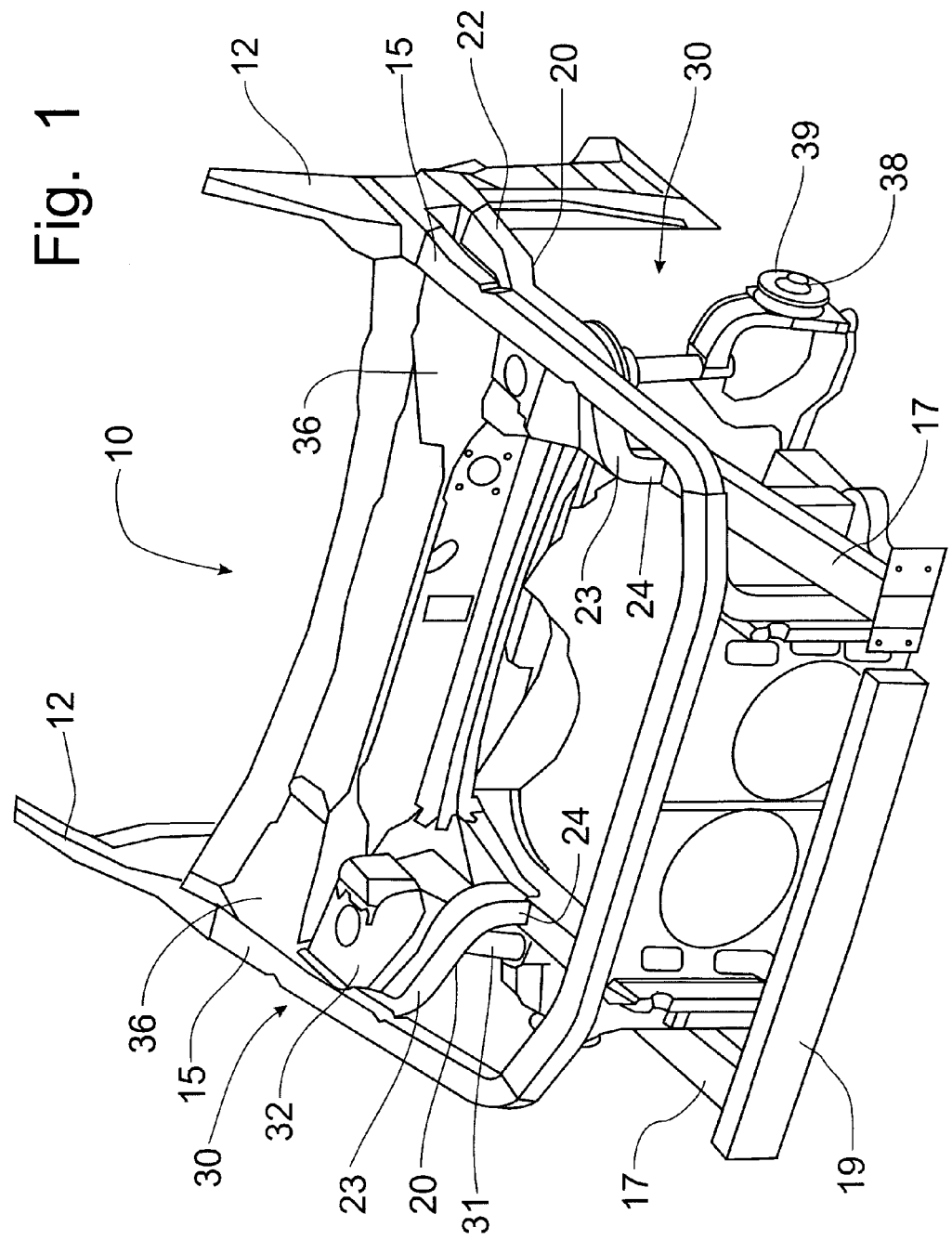
FIG. 1 is a left front perspective view of a frame for the front end of an automobile incorporating the principles of the instant invention, the rearward portions of the automotive frame being broken away for purposes of clarity.
Figure 2:
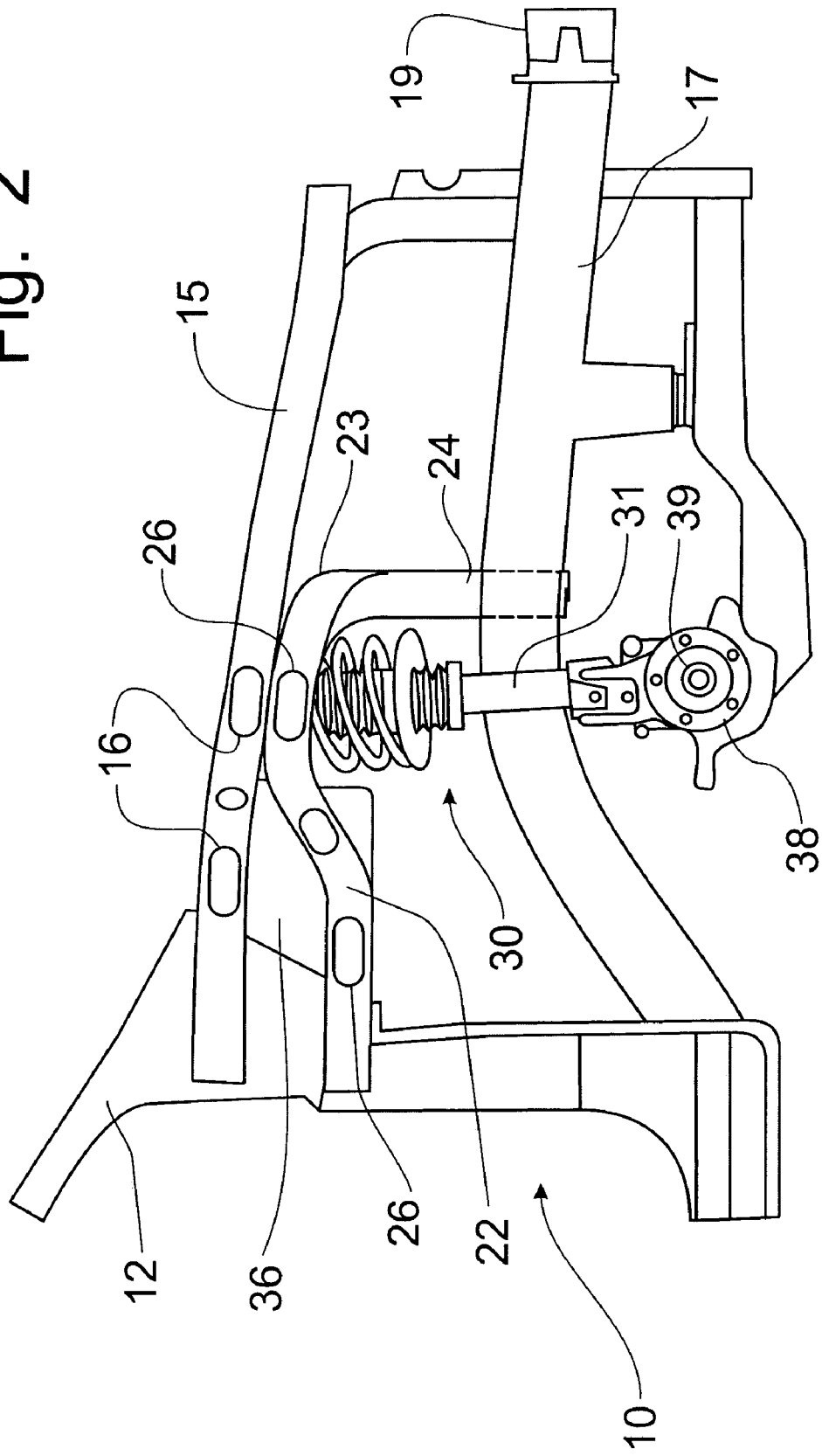
FIG. 2 is a right side elevational view of the front end of the automotive frame depicted in FIG. 1 showing the shock tower support member.
Figure 3:
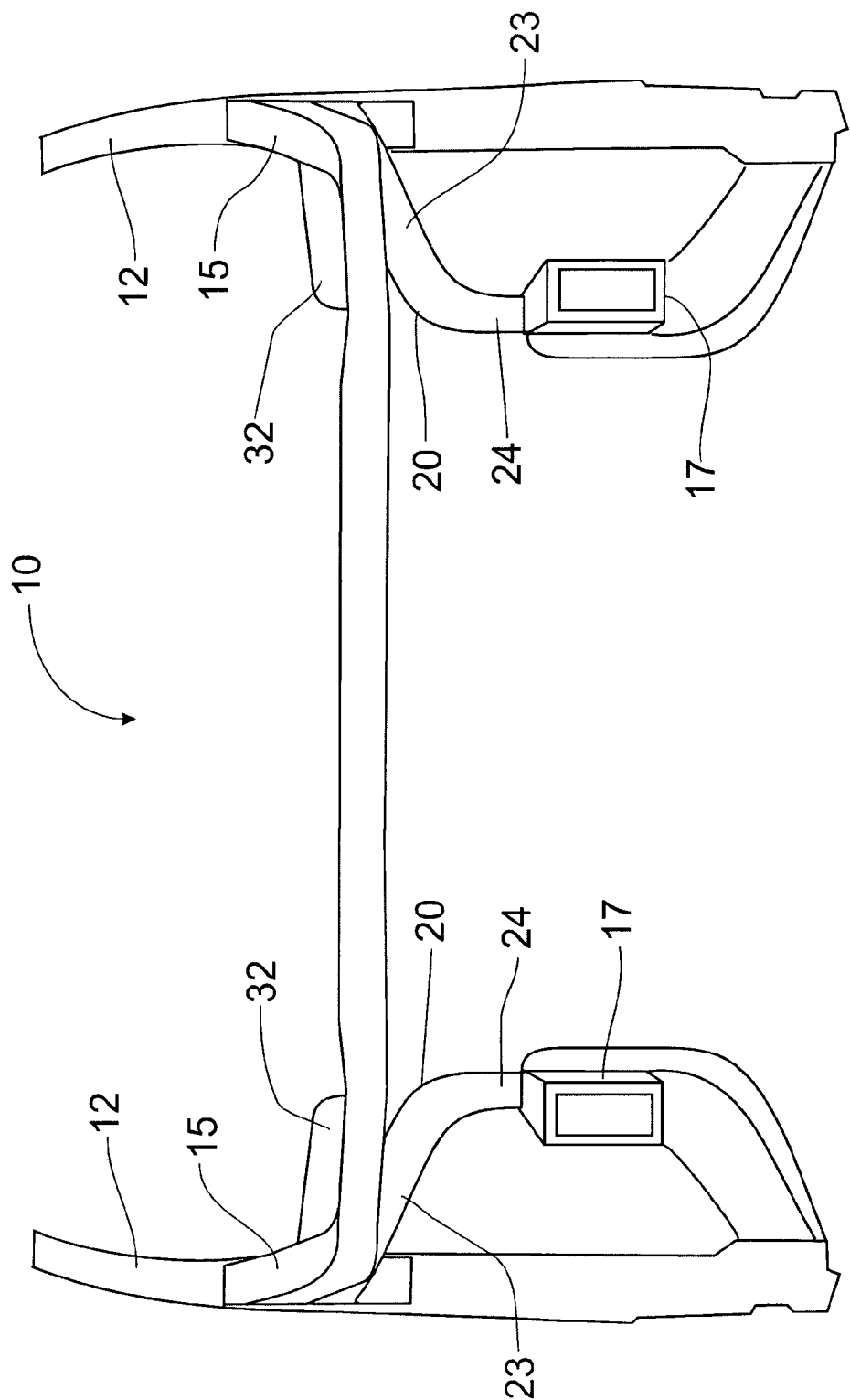
FIG. 3 is a front side elevational view of the front end of the automotive frame depicted in FIG. 1 showing the shock tower support member.

Referring to FIGS. 1–4, a tubular front structure, including a shock tower support, forming a part of the front end of an automobile frame and incorporating the principles of the instant invention can best be seen. The frame 10 of the automobile is preferably formed from hydroformed tubular members. Such tubular members can be spot-welded to form an integral frame assembly for the front end of a vehicle.

Hydroforming is a process by which a standard tubular stock member is placed into a form shaped to correspond to the particular member to be formed and to correspond to the particular section required for the frame design. A liquid is then introduced into the interior of the tubular stock and pressurized until the tubular stock expands to assume the shape defined by the configured form. The expanded and re-shaped tubular stock now has a substantially different shape. By forming cutouts and other access openings into the re-shaped tubular member, spot-welding electrodes can gain access to opposing adjacent sides to create a weld bond between juxtaposed members. In this manner, a frame, as an example, for an automobile can be created using in large part hydroformed tubular members. One skilled in the art will readily recognize that some MIG welding will be required in areas where access holes are detrimental to the integrity of the frame structure. Preferably, such MIG welding processes are performed at a sub-assembly or at a supplier level.

In the automotive front end frame 10 depicted in the drawings, the upper rail 15, which continues around the upper portion of the frame 10 in a U-shaped configuration, is formed from welded hyrdroformed members. Similarly, the lower rails 17, which project generally longitudinally to join with the front bumper support 19, is formed as a tubular hydroformed member. Likewise, the shock tower support member 20 is a hydroformed tubular member that has a curved shape that includes a generally longitudinally extending portion 22, a curved portion 23, and a generally vertical portion 24.

The longitudinally extending portion 22 of the shock tower support member 20 is positioned immediately below the upper frame rail 15 so that the top of the shock tower support member 20 is welded to the bottom surface of the upper frame rail 15. To accomplish this welding process, both the upper frame rail 15 and the shock tower support member 20 are formed with access ports 16, 26 that become adjacent one another to permit the electrodes of the spot-welder to contact the appropriate surfaces of the frame members 15, 20. The insertion of multiple welds between the upper frame rail 15 and the longitudinal portion 22 of the shock tower support member 20 places these welds into a shear loading in crash situations where the forces urge one of the frame members 15, 20 to separate from the other member 15, 20.

The shock tower support member 20 then curves inwardly along said curved portion 23 around the top pan 32 of the shock tower 30 and extends downwardly into engagement with the corresponding lower frame rail 17. Since the lower frame rail 17 is formed as a tubular member, an opening is formed in the top surface of the lower frame rail 17 and the vertical portion 24 of the shock tower support member 20 is inserted into the lower frame rail 17 until the end of the vertical portion 24 is aligned with the bottom surface of the lower frame rail 17. Spot-welding the vertical portion 24 of the shock tower support member 20 to the lower frame rail 17 along both the top surface of the lower frame rail 17 and the bottom surface of the lower frame rail 17 provides an integral frame connection between the shock tower support member 20 and the lower frame rail 17, thus providing a strong, durable and easily accessed joint. Alternatively, the vertical portion 24 can be joined to the lower frame rail 17 by MIG welding, preferably at the supplier level.

The top pan member 32 of the shock tower 30 is a stamped piece of sheet metal that is welded to both the upper frame rail 15 and the curved portion 23 of the shock tower support member 20. Since the curved shape of the shock tower support member 20 provides support for the front edge of the top pan 32, and a strong integral frame construction, the normal front apron, a stamped sheet metal member that traditionally is welded to the top pan 32 and the upper rail 15, can be eliminated and replaced with a lightweight plastic apron member 35 that can be pre-assembled with components such as coolant recovery bottle, windshield washer bottle, or engine components.

As best seen in FIG. 1, the longitudinal portion 22 of the shock tower support member 20 is bent to deflect downwardly from the upper frame rail 15 and intersect with the hinge pillar 12 at a location vertically spaced from the intersection of the upper frame rail 15 with the hinge pillar 12, thus providing a very stable and strong joint between the front frame 10 of the automobile and the remaining frame structure represented by the hinge pillar 12. The rear apron 36 provides further stability and is welded to both the upper rail 15 and the shock tower support member 20 by spot-welding with additional access ports 16, 26 being strategically provided in the frame components 15, 20.

The above-described structure improves the stiffness of the shock tower assembly 30 by providing greater stability at the hinge pillar 12 and by welding the shock tower support member 20 to the upper frame rail 15 and insertion into the lower frame rail 17. The shock absorber 31 resists the road forces transmitted through the front axle 38 and associated wheels (not shown) attached to the hubs 39 via the support thereof associated with the shock tower support member 20.

Crash performance is also improved by the increased stability if the front frame 10. The placement of the shock tower support member 20 to span between the upper and lower frame rails 15, 17, permits forces encountered during front end crashes to be channeled into the shock tower support member 20 and carried from the lower frame rail 17 to the upper frame rail 15. In addition, the spot-welds between the shock tower support member 20 and the upper frame rail 15 are positioned to be in shear loading to further resist forces encountered thereby.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. In an automotive frame assembly having an upper frame rail affixed to a hinge pillar and extending generally forwardly therefrom, and a lower frame rail affixed to said hinge pillar at a location spaced vertically below said upper frame rail, said automotive frame supporting a shock tower assembly, including a shock absorber, connected to a front wheel assembly to absorb and resist road forces encountered by said front wheel assembly, the improvement comprising:
    a shock tower support member directly connected to said shock tower assembly and being formed to extend forwardly from said hinge pillar, connect with said upper frame rail and terminate at said lower frame rail.

2. The automotive frame of claim 1 wherein said shock tower support member includes a generally longitudinal portion connected to said hinge pillar and to said upper frame rail, a curved portion positioned adjacent to said shock tower assembly, and a generally vertical portion connected to said lower frame rail.

3. The automotive frame of claim 2 wherein said generally vertical portion is sized to fit within a vertically oriented opening in said lower frame rail such that said generally vertical portion terminates adjacent a bottom surface of said lower frame rail, said generally vertical portion being welded to said lower frame rail along a top surface of said lower frame rail and along said bottom surface.

4. The automotive frame of claim 3 wherein said shock tower support member, said lower frame rail, and said upper frame rail are hydroformed tubular member.

5. The automotive frame of claim 4 wherein said generally longitudinal portion of said shock tower support member includes a forward portion spot-welded to said upper frame rail, and a rearward portion that is angled downwardly relative to said upper frame rail so as to intersect said hinge pillar at a location vertically spaced below said upper frame rail.

6. The automotive frame of claim 5 wherein said shock tower support member is connected to said hinge pillar at a location vertically between said upper and lower frame rails.

7. The automotive frame of claim 5 wherein said shock tower assembly includes a top pan member welded to said curved portion of said shock tower support member and to said upper frame rail.

8. A frame assembly for a front-end portion of an automobile, said frame assembly supporting a shock tower assembly, including a shock absorber, connected to a front wheel assembly to absorb and resist road forces encountered by said front wheel assembly, comprising:
    a generally upright hinge pillar;
    an upper frame rail affixed to said hinge pillar and extending generally forwardly therefrom;
    a lower frame rail affixed to said hinge pillar at a location spaced vertically below said upper frame rail; and
    a shock tower support member interconnecting said hinge pillar, said upper frame rail and said lower frame rail, said shock tower support member including:
    a generally longitudinal portion having a rearward portion connected to said hinge pillar and a forward portion welded to said upper frame rail;
    a curved portion abutting said shock tower assembly; and
    a generally vertical portion connected to said lower frame rail.

9. The frame assembly of claim 8 wherein said generally vertical portion is engaged with said lower frame rail through a vertically oriented opening formed in said lower frame rail such that said generally vertical portion terminates adjacent a bottom surface of said lower frame rail, said generally vertical portion being welded to said lower frame rail along a top surface of said lower frame rail and along said bottom surface.

10. The automotive frame of claim 9 wherein said shock tower support member, said lower frame rail, and said upper frame rail are hydroformed tubular members that are spot-welded where connection is effected.

11. The automotive frame of claim 10 wherein said rearward portion is angled downwardly relative to said upper frame rail so as to intersect said hinge pillar at a location vertically spaced below said upper frame rail.

12. The automotive frame of claim 11 wherein said shock tower support member is connected to said hinge pillar at a location vertically between said upper and lower frame rails.

13. The automotive frame of claim 11 wherein said shock tower assembly includes a top pan member welded to said curved portion of said shock tower support member and to said upper frame rail.

14. A shock tower support member for supporting a shock tower assembly in an automotive vehicle having an upper frame rail affixed to a hinge pillar and extending generally forwardly therefrom, and a lower frame rail affixed to said hinge pillar at a location spaced vertically below said upper frame rail, said shock tower assembly including a shock absorber connected to a front wheel assembly to absorb and resist road forces encountered by said front wheel assembly, comprising:
    a generally longitudinal portion having a rearward portion connected to said hinge pillar and a forward portion spot-welded to said upper frame rail, said rearward portion being angled downwardly relative to said upper frame rail so as to intersect said hinge pillar at a location vertically spaced below said upper frame rail;
    a curved portion positioned adjacent to said shock tower assembly and curving around a forward side of said shock tower assembly; and
    a generally vertical portion connected to said lower frame rail.

15. The shock tower support member of claim 14 wherein said generally vertical portion is engaged with said lower frame rail through a vertically oriented opening formed in said lower frame rail such that said generally vertical portion terminates adjacent a bottom surface of said lower frame rail, said generally vertical portion being welded to said lower frame rail along a top surface of said lower frame rail and along said bottom surface.

16. The shock tower support member of claim 15 wherein said shock tower support member, said lower frame rail, and said upper frame rail are hydroformed tubular members that are spot-welded where connection is effected.

17. The shock tower support member of claim 16 wherein said shock tower assembly includes a top pan member welded to said curved portion of said shock tower support member and to said upper frame rail.

* * * * *